United States Patent Office 3,535,266
Patented Oct. 20, 1970

3,535,266
GLASS LASER COMPOSITIONS
Haynes A. Lee, Jr., Sylvania, Ohio, assignor to Owens-Illinois, Inc., a corporation of Ohio
No Drawing. Continuation-in-part of application Ser. No. 538,595, Mar. 30, 1966. This application Apr. 25, 1966, Ser. No. 544,714
Int. Cl. C03c 3/28; C09k 1/04; H01s 3/16
U.S. Cl. 252—301.4
10 Claims

ABSTRACT OF THE DISCLOSURE

Glass lasers wherein the glass is based on the silica-alumina-magnesia-calcia glass system or the silica-alumina-lithia glass system and containing a laseable amount of neodymium oxide. The transparent glass lasers have an average coefficient of lineal expansion of less than about $65 \times 10^{-7}/°$ C.

---

This application is a continuation-in-part of my co-pending application, Ser. No. 538,595 filed Mar. 30, 1966 and now abandoned.

The present invention relates to novel glass compositions having certain valuable properties; and more particularly, glass compositions that exhibit laser action, novel glass lasers, and process of producing same.

The term "laser" is an acronym for light amplification by stimulated emission of radiation. A laser is a device capable of amplifying or generating coherent light. Lasers emit highly monochromatic optical radiation in the form of a narrowly plane wave with the beam angle diversions theoretically limited by diffraction effects. When a material exhibits stimulated emission of radiation under a particular set of conditions it is said to lase.

The laser body can take various forms. For example, it may be a small cylinder or rod, the end faces of which are plane and may have an extremely high degree of parallel accuracy. Also, the end faces may be cut so as to be totally internally reflecting or cut to a Brewster angle to decrease the reflection loss. One end of the rod may be completely reflecting or highly polished and the other of the end faces partially reflecting. It will be apparent that the configuration and characteristics of the laser body can vary widely. In operation, the laser body is irradiated by suitable means such as a flash lamp operating for a few milliseconds at a time with an input energy of normally greater than about 100 joules.

In many instances involving actual operation of the laser, most of the input energy is dissipated as heat and only a small portion of the energy emitted by the source of radiation is absorbed by the laser material. This energy provides the excitation for the laser. The laser cylinder funnels the energy which is absorbed over a broad spectral region into a narrow emission line whose wave length is a function of the laseable substance contained in the laser host. Further information concerning lasers will be found in the book entitled "Lasers—Generation of Light by Stimulated Emission" by Bela A. Lengyel, John Wiley & Sons, New York, 1962.

Because of their unique properties, lasers may be used for a wide variety of purposes including scientific experimentation, use of light as a carrier for intelligence and use of light for concentrations of power for technological and military purposes. To illustrate, in the field of communications, it has been estimated that under proper controls an extremely potent information carrier could be achieved and under ideal conditions a single laser could replace all of the information carrying systems between East and West coasts of the United States. In addition, because of its extremely narrow beam, a laser is suitable for point-to-point communications in space where atmospheric attenuation does not interfere with the propagation of radiation. Other applications for lasers include surgical and biological applications, control over chemical reactions, and various other purposes. Recently, lasers have achieved wide attention and it is generally acknowledged that they represent an extremely valuable tool for a great many purposes.

One of the disadvantages of previously known lasers is the fact that large energy inputs in a small amount of time are required to produce laser action which results in severe thermal distortion to the laser host. Conventional materials utilized as the host for laseable substances have extremely poor characteristics in this respect. Any materials possessing relatively large coefficients of thermal expansion would be undesirable for lasers in many applications. The enormous amounts of heat which are absorbed by the host tend to cause considerable thermal distortion and changes in the optical path of the host. As a result, these effects may cause breakage or interfering laser modes.

Accordingly, it is the object of the present invention to provide novel laseable glass compositions which diminish the disadvantages and the drawbacks associated with prior known methods and compositions.

It is a further object of the present invention to provide low expansion laser hosts which do not undergo large changes in dimension with changes in temperature.

It is a further object of the present invention to provide glass laser compositions which exhibit a relatively low coefficient of thermal expansion.

It is a further object of the present invention to provide a method for making laseable compositions which diminish the disadvantages and drawbacks of prior known methods and compositions.

It is a further object of the present invention to provide a method for making lasers wherein the host composition has a relatively low coefficient of thermal expansion.

In attaining the above objects, one feature of the present invention resides in a novel glass composition containing a laseable substance and which exhibits a relatively low coefficient of thermal expansion.

A further feature of the present invention resides in laseable compositions wherein the glass host is a selected composition of the silica-alumina-lithia system $$(SiO_2\text{-}Al_2O_3\text{-}Li_2O)$$

having a relatively low coefficient of thermal expansion.

A further feature of the present invention resides in relatively low expansion laseable glass compositions formed of the silica-alumina-lithia system and as the laseable substance, neodymium oxide ($Nd_2O_3$).

A further feature of the present invention resides in laseable compositions wherein the glass host is a selected composition of the silica-alumina-magnesia-calcia system ($SiO_2\text{-}Al_2O_3\text{-}MgO\text{-}CaO$).

A still further feature of the present invention resides in novel lasers formed of a glass composition selected from the silica-alumina-magnesia-calcia system having dispersed therein a sufficient amount of neodymium oxide.

A still further feature of the present invention resides in novel lasers wherein the host is formed of selected glass compositions possessing a relatively low coefficient of thermal expansion.

The above as well as other objects, features and advantages of the present invention will become apparent from the following detailed description thereof.

It is known that one of the significant drawbacks of lasers is the fact that large energy inputs are required to produce laser action and that the energy absorbed by the host is manifested by considerable development of heat which tends to create rapid dimensional changes and may even cause rupture of the host material. According to the present invention, the energy absorbing capacity and the life of lasers can be improved and the range of applications for which lasers have heretofore been used can be considerably extended. Lasers of the present invention resist rapid dimensional changes when subjected to heat and hence markedly increased service life because of elmination of breakage is achieved.

According to the present invention, novel glass laser compositions having relatively low coefficient of thermal expansion are provided, such coefficients being under about $65 \times 10^{-7}/°$ C. and generally being about 40 to $60 \times 10^{-7}/°$ C. The glass host material is selected from systems containing silica and alumina and specified other ingredients. Examples include the silica-alumina-lithia system and the silica-alumina-magnesia-calcia system. The lasers are prepared by dispersing in the glass as the laseable substance, a sufficient amount of neodynium oxide. The amount of neodynium oxide incorporated into the laser host glass is not narrowly critical, but generally it will be in the range of about 1 to about 4%, and up to as high as about 8% by weight of the total composition.

Compositions that may be used for purposes of the present invention are glasses selected from the silica-alumina-lithia system comprising the following ingredients in percent by weight based on the total composition:

| Component— | Percent range |
|---|---|
| $SiO_2$ | 54–80 |
| $Al_2O_3$ | 4–34.5 |
| CaO | 0–5.5 |
| ZnO | 0–1.3 |
| BaO | 0–10.1 |
| $Li_2O$ | 3.9–5.5 |
| $Na_2O$ | 0–10 |
| $ZrO_2$ | 0–5 |
| $TiO_2$ | 0–1.8 |

The neodynium oxide is then added to the host material in varying amounts, for example, 1–4% or more by weight. It will be apparent that the properties of the resulting laser will depend in part on the choice of host composition.

Futher included among the host compositions for purposes of the present invention are glasses selected from the silicia-alumina-magnesia-calcia system containing the following ingredients in the indicated approximate amounts based on the weight of the total composition:

| Component— | Weight range |
|---|---|
| $SiO_2$ | 54–80 |
| $Al_2O_3$ | 4–20 |
| MgO | 4–10 |
| CaO | 0–5.5 |
| $Na_2O$ | 0–10 |
| $ZrO_2$ | 0–5 |
| BaO | 0–10 |
| $TiO_2$ | 0–1.8 | in which $MgO+CaO+BaO+Na_2O$ must total at least about 19 weight percent. The neodymium oxide is then added to the host glass material in varying amounts including, for example, 1–4% or more by weight.

Further examples of glass laser compositions of the present invention are shown in the examples which follow hereinafter below.

The various raw material compenents of the glass compositions can be in various forms such as oxides, carbonates and the like. A melt is prepared by mixing the components together and dispersing the neodymium oxide therein. Minor amounts of other ingredients may also be present in the melt provided that their presence does not adversely affect the final composition or the desired end properties. It is important that the iron content be kept very low in neodymium laser glass as FeO has an absorption band that overlaps the lasing wave length of $1.06\mu$. The level of iron in the glasses prepared ranged from about 25 to 50 p.p.m. $Fe_2O_3$. The tolerable upper limit to this value is probably about 100 p.p.m. $Fe_2O_3$.

EXAMPLE I

| Compenent— | Weight percent |
|---|---|
| $SiO_2$ | 65.4 |
| $Al_2O_3$ | 20.9 |
| CaO | 2.7 |
| ZnO | 1.3 |
| $Li_2O$ | 3.9 |
| $ZrO_2$ | 2.0 |
| BaO | 1.8 |
| $Nd_2O_3$ | 2.0 |

The foregoing composition was melted from reagent grade raw materials to a high optical quality. Rods of about ½ inch diameter by 4 inches long were prepared from the melt. The ends of the rod were polished to a close tolerance and the rod was then placed in the laser system and operated satisfactorily.

EXAMPLE II

| Component— | Weight percent |
|---|---|
| $SiO_2$ | 63.4 |
| $Al_2O_3$ | 20.9 |
| BaO | 4.0 |
| $Li_2O$ | 3.9 |
| $TiO_2$ | 1.8 |
| $ZrO_2$ | 2.0 |
| $Nd_2O_3$ | 4.0 |

A melt was prepared having the above composition using reagent grade raw materials. The melt was observed to have high optical quality. After annealing, rods were prepared from the melt. The rods had a dimension of ½ inch diemater by 4 inches long. The ends of the rods were polished to close tolerance and then several rods were placed in a laser system and tested and found to be satisfactory.

EXAMPLE III

| Component— | Weight percent |
|---|---|
| $SiO_2$ | 54.2 |
| $Al_2O_3$ | 34.5 |
| $Li_2O$ | 5.5 |
| $ZrO_2$ | 2.0 |
| $TiO_2$ | 1.8 |
| $Nd_2O_3$ | 2.0 |

Reagent grade raw materials were used to prepare the melt having the theoretical composition set forth above. The melt was annealed and rods were prepared from the melt. The rods have the same dimension as that shown in the previous examples. The rods were tested in the laser system and found to be satisfactory.

EXAMPLE IV

| Component— | Weight percent |
|---|---|
| $SiO_2$ | 59 |
| $Al_2O_3$ | 19 |
| MgO | 4 |
| CaO | 5.5 |
| BaO | 10.1 |
| $Nd_2O_3$ | 2.0 |

The above composition was prepared using the same procedure as used in the foregoing examples. The laser rod was made from the composition and found to be satisfactory.

EXAMPLE V

| Component— | Weight percent |
|---|---|
| $SiO_2$ | 70 |
| $Al_2O_3$ | 4 |
| MgO | 10 |
| $Na_2O$ | 10 |
| $ZrO_2$ | 5 |
| $Nd_2O_3$ | 1.0 |

A laser having the above composition was prepared according to the general method described previously and tested in the laboratory laser apparatus and found to be satisfactory.

EXAMPLE VI

| Component— | Weight percent |
|---|---|
| $SiO_2$ | 80 |
| $Al_2O_3$ | 5 |
| $CaO$ | 5 |
| $ZnO$ | 1 |
| $Li_2O$ | 5 |
| $Na_2O$ | 3 |
| $Nd_2O_3$ | 1.0 |

The above composition was prepared according to the method described above and formed into a laser rod of appropriate dimensions.

What is claimed is:

1. A transparent relatively low expansion glass laser consisting essentially of the following composition in parts by weight:

| Component— | Weight percent |
|---|---|
| $SiO_2$ | 54–80 |
| $Al_2O_3$ | 4–34.5 |
| $CaO$ | 0–5.5 |
| $ZnO$ | 0–1.3 |
| $BaO$ | 0–10.1 |
| $Li_2O$ | 3.9–5.5 |
| $Na_2O$ | 0–10 |
| $ZrO_2$ | 0–5 |
| $TiO_2$ | 0–1.8 |
| $Nd_2O_3$ | 1–8 |

2. A transparent relatively low expansion glass laser consisting essentially of the following composition in parts by weight:

| Component— | Weight percent |
|---|---|
| $SiO_2$ | 54–80 |
| $Al_2O_3$ | 4–20 |
| $MgO$ | 4–10 |
| $CaO$ | 0–5.5 |
| $Na_2O$ | 0–10 |
| $ZrO_2$ | 0.5 |
| $BaO$ | 0–10 |
| $TiO_2$ | 0–1.8 |
| $Nd_2O_3$ | 1–8 | in which the total amount of $MgO+CaO+BaO+Na_2O$ must total at least about 19 weight percent.

3. A transparent low expansion glass laser as defined in claim 1 consisting essentially of the following composition in parts by weight:

| Component— | Weight percent |
|---|---|
| $SiO_2$ | 65.4 |
| $Al_2O_3$ | 20.9 |
| $CaO$ | 2.7 |
| $ZnO$ | 1.3 |
| $Li_2O$ | 3.9 |
| $ZrO_2$ | 2.0 |
| $BaO$ | 1.8 |
| $Nd_2O_3$ | 2.0 |

4. A transparent relatively low expansion glass laser as defined in claim 1 consisting essentially of the following composition in parts by weight:

| Component — | Weight percent |
|---|---|
| $SiO_2$ | 63.4 |
| $Al_2O_3$ | 20.9 |
| $Li_2O$ | 3.9 |
| $ZrO_2$ | 2.0 |
| $BaO$ | 4.0 |
| $Nd_2O_3$ | 4.0 |
| $TiO_2$ | 1.8 |

5. A transparent low expansion glass laser as defined in claim 1 consisting essentially of the following composition in parts by weight:

| Component— | Weight percent |
|---|---|
| $SiO_2$ | 54.2 |
| $Al_2O_3$ | 34.5 |
| $Li_2O$ | 5.5 |
| $ZrO_2$ | 2.0 |
| $TiO_2$ | 1.8 |
| $Nd_2O_3$ | 2.0 |

6. A transparent low expansion glass laser as defined in claim 2 consisting essentially of the following composition in parts by weight:

| Component— | Weight percent |
|---|---|
| $SiO_2$ | 59 |
| $Al_2O_3$ | 19 |
| $MgO$ | 5.5 |
| $BaO$ | 10.1 |
| $Nd_2O_3$ | 2.0 |

7. A transparent low expansion glass laser as defined in claim 2 consisting essentially of the following composition in parts by weight:

| Component— | Weight percent |
|---|---|
| $SiO_2$ | 70 |
| $Al_2O_3$ | 4 |
| $MgO$ | 10 |
| $Na_2O$ | 10 |
| $ZrO_2$ | 5 |
| $Nd_2O_3$ | 1.0 |

8. A glass laser composition as defined in claim 2 consisting essentially of the following composition in parts by weight:

| Component— | Weight percent |
|---|---|
| $SiO_2$ | 80 |
| $Al_2O_3$ | 5 |
| $CaO$ | 5 |
| $ZnO$ | 1 |
| $Li_2O$ | 5 |
| $Na_2O$ | 3 |
| $Nd_2O_3$ | 1.0 |

9. A transparent glass laser as set forth in claim 1 wherein the average coefficient of thermal expansion is less than about $65 \times 10^{-7}/°C$.

10. A transparent glass laser as set forth in claim 2 which has an average coefficient of thermal expansion of less than about $65 \times 10^{-7}/°C$.

References Cited

UNITED STATES PATENTS

| 3,270,290 | 8/1966 | Maurer | 252—301.4 |
| 3,384,597 | 5/1968 | De Paolis | 252—301.4 |

ROBERT D. EDMONDS, Primary Examiner

U.S. Cl. X.R.

106—52

PO-1050
(5/69)

UNITED STATES PATENT OFFICE
CERTIFICATE OF CORRECTION

Patent No. 3,535,266      Dated October 20, 1970

Inventor(s) Haynes A. Lee, Jr.

It is certified that error appears in the above-identified patent and that said Letters Patent are hereby corrected as shown below:

Col. 3, line 9, "elmination" should be --elimination--; line 19, "neodynium" should be --neodymium--; line 20, "neodynium" should be --neodymium--; line 39, "neodynium" should be --neodymium--; line 46, "silicia-" should be --silica- --; line 66, "compenents" should be --components--. Col. 4, line 5, "Compenent" should be --Component--; line 35, "diemater" should be --diameter--. Col. 5, line 42, "0.5" should be --0-5--.

Signed and sealed this 17th day of April 1973.

(SEAL)
Attest:

EDWARD M. FLETCHER, JR.
Attesting Officer

ROBERT GOTTSCHALK
Commissioner of Patents